United States Patent
Zhou

(10) Patent No.: US 10,874,494 B2
(45) Date of Patent: Dec. 29, 2020

(54) MULTI-FUNCTIONAL VISUAL ELECTRIC TOOTHBRUSH

(71) Applicant: Xing Zhou, Guangzhou (CN)

(72) Inventor: Xing Zhou, Guangzhou (CN)

(73) Assignee: Xing Zhou, Guangdong (CN)

(*) Notice: Subject to any disclaimer, the term of this patent is extended or adjusted under 35 U.S.C. 154(b) by 55 days.

(21) Appl. No.: 16/212,481

(22) Filed: Dec. 6, 2018

(65) Prior Publication Data
US 2019/0105141 A1 Apr. 11, 2019

Related U.S. Application Data

(63) Continuation of application No. PCT/CN2017/086825, filed on Jun. 1, 2017.

(30) Foreign Application Priority Data

Jan. 16, 2017 (CN) .......................... 2017 1 0030761

(51) Int. Cl.
*A61C 17/00* (2006.01)
*A61C 17/22* (2006.01)
(Continued)

(52) U.S. Cl.
CPC ........ *A61C 17/221* (2013.01); *A46B 15/0002* (2013.01); *A61C 15/047* (2013.01);
(Continued)

(58) Field of Classification Search
CPC ..... A61C 17/221; A61C 17/06; A61C 15/047; A61C 17/227; A61C 17/32; A61C 17/34; A61C 17/3481; A46B 15/002
See application file for complete search history.

(56) References Cited

U.S. PATENT DOCUMENTS 2,140,307 A * 12/1938 Belaschk ............... A61C 17/26
15/28
3,242,516 A * 3/1966 Cantor ................. A61C 17/26
15/28
(Continued)

FOREIGN PATENT DOCUMENTS

CN 102113762 A 7/2011
CN 102342864 A 2/2012
(Continued)

OTHER PUBLICATIONS

Zhou, Communicaton Pursuant to Rules 161(2) and 162, EP17891621.9, dated Aug. 23, 2019, 3 pgs.
(Continued)

*Primary Examiner* — Nicholas D Lucchesi
(74) *Attorney, Agent, or Firm* — Morgan, Lewis & Bockius LLP

(57) ABSTRACT

Disclosed is a multi-functional visual electric toothbrush, including a main unit, an oral viewer, an interdental cleaning appliance and an electric toothbrush head. The oral viewer is connected to the main unit, the interdental cleaning appliance is connected to the front end of the oral viewer, and the electric toothbrush head is connected to a toothbrush driving mechanism. A circuit system and a control system of the main unit can not only transfer the energy of a power supply to the toothbrush driving mechanism, so as to drive the electric toothbrush head to work for large-area oral cleaning, but also connect a lighting system, an observation system and a switch of the oral viewer to control the oral viewer to work. The interdental cleaning appliance may be used cooperatively with the oral viewer to perform targeted cleaning on difficult-to-clean food debris in an oral cavity.

20 Claims, 13 Drawing Sheets

(51) Int. Cl.
*A46B 15/00* (2006.01)
*A61C 17/34* (2006.01)
*A61C 17/32* (2006.01)
*A61C 15/04* (2006.01)
*A61C 17/06* (2006.01)

(52) U.S. Cl.
CPC ............ *A61C 17/06* (2019.05); *A61C 17/227* (2013.01); *A61C 17/32* (2013.01); *A61C 17/34* (2013.01); *A61C 17/3481* (2013.01); *A46B 2200/1066* (2013.01); *A61C 2204/00* (2013.01)

(56) References Cited

U.S. PATENT DOCUMENTS

| | | | | |
|---|---|---|---|---|
| 2009/0056044 A1* | 3/2009 | Rizoiu | .................. | A46B 5/002 15/22.1 |
| 2010/0281636 A1* | 11/2010 | Ortins | .................. | A46B 15/001 15/4 |
| 2010/0309302 A1* | 12/2010 | Yang | .................. | A61B 1/00016 348/77 |
| 2012/0036658 A1* | 2/2012 | Schaefer | ................ | H02K 33/10 15/28 |
| 2012/0192367 A1* | 8/2012 | Lin | ...................... | A61C 17/224 15/22.1 |
| 2013/0061412 A1* | 3/2013 | Vashi | .................. | A46B 5/0095 15/106 |
| 2015/0107034 A1* | 4/2015 | Shani | .................. | A61C 17/221 15/22.1 |
| 2015/0230595 A1 | 8/2015 | Vila | | |
| 2018/0168332 A1* | 6/2018 | Wagner | ................ | A61C 17/225 |
| 2019/0090999 A1* | 3/2019 | Vetter | ................ | A46B 15/0012 |
| 2019/0117356 A1* | 4/2019 | Bartschi | ................ | A46B 13/023 |
| 2020/0054426 A1* | 2/2020 | Prendergast | ....... | A61C 17/0208 |

FOREIGN PATENT DOCUMENTS

| | | |
|---|---|---|
| CN | 202161426 U | 3/2012 |
| CN | 103565394 A | 2/2014 |
| CN | 104905547 A | 9/2015 |
| CN | 104921826 A | 9/2015 |
| CN | 105769367 A | 7/2016 |
| CN | 106137433 A | 11/2016 |
| CN | 206924128 U | 1/2018 |

OTHER PUBLICATIONS

Zhou, International Search Report and Written Opinion, PCT/CN2017/086825, dated Oct. 12, 2017, 14 pgs.
Zhou, International Preliminary Report on Patentability, PCT/CN2017/086825, dated Jul. 16, 2019, 5 pgs.

* cited by examiner

MULTI-FUNCTIONAL VISUAL ELECTRIC TOOTHBRUSH

CROSS-REFERENCE TO RELATED APPLICATIONS

The application is a continuation application of PCT/CN2017/086825, entitled "MULTI-FUNCTIONAL VISUAL ELECTRIC TOOTHBRUSH" filed on Jun. 1, 2017, which claims priority to Chinese Patent Application No. 201710030761.5, filed with the State Intellectual Property Office of the People's Republic of China on Jan. 16, 2017, and entitled "MULTI-FUNCTIONAL VISUAL ELECTRIC TOOTHBRUSH", all of which are hereby incorporated by reference in their entirety.

TECHNICAL FIELD

The present disclosure relates to an oral cleaning tool, and more particularly to a multi-functional visual electric toothbrush for cleaning teeth, tooth gaps and an oral cavity.

BACKGROUND

An electric toothbrush in the prior art has 30,000 vibrations or more per minute, which can cause a large amount of tiny bubbles in the mixture of toothpaste and water in an oral cavity, and attempts to use the pressure generated when the bubbles burst to achieve the purpose of cleaning dirt deep into tooth gaps. Even so, food debris embedded in the tooth gaps is still difficult to remove completely by means of the electric toothbrush in the prior art.

With age increase or pathological reasons, it is very easy to cause gingival atrophy and enlargement of tooth gaps, and it is very prone to causing food debris. If the oral cavity cannot be cleaned in time, on the one hand, bad breath may be produced, and on the other hand, various dental diseases, oral diseases, and especially periodontitis may occur.

In view of this situation, various products such as dental floss, interdental brushes and water floss have been developed on the current market for assisting users in use. Although there are products such as dental floss and interdental brushes of various structures and different specifications on the market today, the existing products are generally disadvantageous in that it is unlikely to observe tooth gaps. Especially when cleaning a gap between the third molar and the second molar or a gap between the second molar and the first molar or a gap between the first molar and the second premolar, because the position of a tooth gap to be cleaned is deep in the oral cavity, the light is very dark in the cleaned part, a user cannot clearly see the tooth gap to be cleaned and can operate only by feeling, which may cause bleeding or injury to gums.

In order to overcome these shortcomings of the prior art, it is necessary to develop a tooth cleaning tool that can clean an oral cavity and teeth quickly and effectively over a large area, and can also clean difficult-to-clean parts such as tooth gaps under visual conditions specially and finely.

SUMMARY

A multi-functional visual electric toothbrush of the present disclosure not only has the large-area and high-efficiency cleaning ability of an electric toothbrush, but also can use a special tool such as an interdental brush, dental floss, a toothbrush, a water pick, an object fetching clamp and an object fetching hook to accurately perform targeted cleaning on difficult-to-clean parts such as tooth gaps under visual conditions.

The present disclosure provides a multi-functional visual electric toothbrush. The multi-functional visual electric toothbrush 900 is characterized by including a main unit 100, an oral viewer 200, an interdental cleaning appliance 400 and an electric toothbrush head 500.

A. The main unit 100 includes a power system 11, a circuit system 12, a control system 13, a toothbrush driving mechanism 14 and a housing 15. The power system 11, the control system 13 and the toothbrush driving mechanism 14 are connected together through the circuit system 12. The electric toothbrush head 500 is connected to the toothbrush driving mechanism 14, and is mounted on the main unit 100.

B. The oral viewer 200 includes a housing 21, a lighting system 23, an observation system 24 and a switch 26. The lighting system 23, the observation system 24, the power system 11 and the switch 26 are connected together through the circuit system 12 and the control system 13. The oral viewer 200 is connected to the main unit 100.

C. The interdental cleaning appliance 400 is mounted on the oral viewer 200.

In the present disclosure, the observation system 24 may be a camera system 24-1. The camera system 24-1 includes a camera 24-1-1, a data processing and output system 24-1-2 and a display 24-1-3. A picture shot by the camera 24-1-1 may be transmitted to the display 24-1-3 in time through the data processing and output system 24-1-2. The display 24-1-3 may be a smart phone 24-1-31, or a computer 24-1-32, or a liquid crystal display/television 24-1-33, or a tablet computer 24-1-34.

The multi-functional visual electric toothbrush of the present disclosure integrates an electric toothbrush, an oral viewer and an interdental cleaning appliance effectively. The circuit system 12 and the control system 13 can not only connect the power system 11 to the toothbrush driving mechanism 14 to allow the toothbrush driving mechanism 14 to drive the electric toothbrush head 500 to work, but also connect the lighting system 23, the observation system 24 and the switch 26 of the oral viewer 200 to provide power required by working for the oral viewer 200, and control the oral viewer 200 to work. Therefore, in the present application, the main unit 100 can not only drive the electric toothbrush head 400, but also provide power and control systems for the lighting system 23, the observation system 24 and the like of the oral viewer 200, and transmit a picture shot by the camera 24-1-1 of the observation system 24 to the display 24-1-3, such as a smart phone 24-1-31, of the observation system 24 in time, so that the interdental cleaning process and cleaning effect of the interdental cleaning appliance 400 can be observed on a mobile phone immediately while cleaning, thereby achieving the purpose of thoroughly cleaning teeth and tooth gaps.

Further, the toothbrush driving mechanism 14 arranged in the main unit 100 may be a motor-driven mechanically rotary toothbrush driving mechanism, and may also be an electrically-driven electromagnetic vibration driving mechanism.

The toothbrush driving mechanism 14 generally adopts an electromagnetic vibration driving mechanism. The toothbrush driving mechanism 14 includes a vibration generating device 14-1 and a vibration transferring device 14-2 capable of transferring vibration generated by the vibration generating device 14-1. One end of the vibration transferring device 14-2 is connected with the vibration generating device 14-1, and the other end is connected with the electric toothbrush head 500.

The vibration generating device 14-1 is an electromagnetic vibration device, which is an electromagnetic oscillator, or a magnetic suspension motor, or a piezoelectric transducer.

The electric toothbrush head 500 is detachably mounted on the vibration transferring device 14-2. Usually, the electric toothbrush head 500 is detachably mounted at a distal end of the vibration transferring device 14-2. The detachable mounting manner may facilitate the detachment of the electric toothbrush head 500 from the main unit 100 for replacement, storage and carrying. In particular, in a detachable mounting manner, when it is necessary to use the interdental cleaning appliance 400 for further cleaning, the electric toothbrush head 500 may be detached from the main unit and replaced with the interdental cleaning appliance 400. It is more convenient for a user to use the interdental cleaning appliance 400 for further cleaning.

The electric toothbrush head 500 is detachably mounted on the vibration transferring device 14-2 in a concave-convex engaging connection manner, an interference fit connection manner or a rotary connection manner. Here, the applicant only enumerates the above three detachable connection manners. Persons skilled in the art may design different connection manners in conjunction with the prior art according to actual needs without departing from the scope of protection of the present application.

The lighting system 23 and the observation system 24 are arranged at a front end 200-1 of the oral viewer 200, and the lighting system 23 and the observation system 24 are connected with the main unit 100 through the circuit system 12 and the control system 13. After the power system 11 is switched on, the switch 26 is turned on, and the main unit 100 can provide electric energy for the oral viewer 200 through the circuit system 12 and the control system 13, and drive the lighting system 23 and the observation system 24 of the oral viewer 200 to work.

The front end 200-1 of the oral viewer 200 is detachably mounted on the main unit 100. The front end 200-1 of the oral viewer 200 is detachably mounted on the main unit 100. When it is necessary to use the electric toothbrush head 500 to brush teeth over a large area, the front end 200-1 of the oral viewer 200 is detached from the main unit 100, the electric toothbrush head 500 is mounted on the vibration transferring device 14-2 of the toothbrush driving mechanism 14, and the main unit 100 drives the electric toothbrush head 500 to work through the toothbrush driving mechanism 14. When it is necessary to further perform targeted cleaning on difficult-to-clean parts such as tooth gaps in the oral cavity, the electric toothbrush head 500 is detached from the vibration transferring device 14-2, the front end 200-1 of the oral viewer 200 is mounted on the main unit 100, the oral cavity cleaning situation may be observed through the oral viewer 200, and the interdental cleaning appliance 400 is mounted on the oral viewer 200 for targeted cleaning as needed. After use, the oral viewer 200, the interdental cleaning appliance 400 and the electric toothbrush head 500 may all be detached from the main unit, which facilitates separate storage and cleaning.

The front end 200-1 of the oral viewer 200 is detachably mounted on the main unit 100 in a rotary connection manner or a concave-convex engaging connection manner. Here, the applicant only enumerates the above two detachable connection manners. Persons skilled in the art may design different connection manners in conjunction with the prior art according to actual needs without departing from the scope of protection of the present application.

The front end 200-1 of the oral viewer 200 is foldably mounted on the main unit 100.

The front end 200-1 of the oral viewer 200 is foldably mounted on the main unit 100 through a rotation shaft type movement mechanism or a concave-convex engagement mechanism. Here, the applicant only enumerates the above two foldable connection manners. Persons skilled in the art may design different connection manners in conjunction with the prior art according to actual needs without departing from the scope of protection of the present application.

The interdental cleaning appliance 400 is an interdental brush 401, or dental floss 402, or a toothbrush 403, or a water pick 404, or an object fetching clamp 405, or an object fetching hook 406. Here, the applicant only enumerates the above six specific interdental cleaning appliances capable of being used cooperatively with the oral viewer 200. Persons skilled in the art may design other different cleaning appliances as needed to be used cooperatively with the oral viewer 200 for further cleaning the oral cavity, without departing from the scope of protection of the present application.

A brush head 401-1 of the interdental brush 401, a line 402-1 of the dental floss 402, bristles 403-1 of the toothbrush 403, a water column sprayed by the water pick 404, a clamp head 405-1 of the object fetching clamp 405 and a head 406-1 of the object fetching hook 406 are within a visual field of the observation system 24 of the oral viewer 200, so that the observation system 24 can conveniently observe the cleaning situation of the interdental cleaning appliance 400 in real time.

The interdental cleaning appliance 400 is detachably mounted on the oral viewer 200 through a connection mechanism 300. The cleaning appliance 400 is detachably mounted on the oral viewer 200. Therefore, the user may replace different interdental cleaning appliances 400 according to the needs of the use process, and the use process is more convenient.

The connection mechanism 300 is a rotary connection mechanism, or a concave-convex engaging connection mechanism, or an interference fit connection mechanism. Of course, persons skilled in the art may also design connection mechanisms adopting different connection manners as needed without departing from the scope of protection of the present application.

The water pick 404 includes a sprayer 404-1, a water tank 404-2, a water pipe 404-3, a water spraying switch 404-4 and a pressurizing device 404-5. The water tank 404-2 and the pressurizing device 404-5 are mounted on the housing 15 of the main unit 100. The sprayer 11 is mounted near the observation system 24 at the front end 200-1 of the oral viewer 200. Therefore, the water flow sprayed by the sprayer 11 may be maintained in the visual field of the observation system 24, so that the cleaning effect of the water pick 404 in the oral cavity is conveniently observed.

The pressurizing device 404-5 is an electric pressurizing device 404-51. The electric pressurizing device 404-51 can realize automatic pressurizing only by turning on the power supply and keep the pressure stable, and the use process is more convenient.

The electric pressurizing device 404-51 is an electric air pressurizing device 404-51-1 or an electric water pressurizing device 404-51-2.

When the electric pressurizing device 404-51 is an electric air pressurizing device 404-51-1, the electric air pressurizing device 404-51-1 fills pressurized air into the water tank 404-2 and pressurizes water in the water tank 404-2, the water spraying switch 404-4 is turned on, and the pressurized water is sprayed out from the sprayer 404-1 through the water pipe 404-3 to rinse teeth or tooth gaps.

Further, the electric water pressurizing device 404-51-2 is a submersible pump 404-51-21 or a water pump 404-51-22.

When the electric water pressurizing device 404-51-2 is a submersible pump 404-51-21, water in the water tank 404-2 is pumped into the submersible pump 404-51-21 for pressurizing, and the water pressurized by the submersible pump 404-51-21 is drained into the water pipe 404-3 and then sprayed out from the sprayer 404-1 to rinse teeth or tooth gaps.

When the electric water pressurizing device 404-51-2 is a water pump 404-51-22, water in the water tank 404-2 is sucked into the water pump 404-51-22, and the water pressurized by the water pump 404-51-22 is drained into the water pipe 404-3 and then sprayed out from the sprayer 404-1 to rinse teeth or tooth gaps.

The sprayer 404-1 of the water pick 404 may be disposed in the housing 21 at the front end 200-1 of the oral viewer 200.

The water pick 404 may be used cooperatively with the interdental brush 401, or the dental floss 402, or the toothbrush 403, or the object fetching clamp 405, or the object fetching hook 406.

The sprayer 404-1 of the water pick 404 is disposed in the housing 21 at the front end 200-1 of the oral viewer 200, so that other interdental cleaning appliances such as the interdental brush 401, or the dental floss 402, or the toothbrush 403, or the object fetching clamp 405, or the object fetching hook 406 may be conveniently mounted at the front end 200-1 of the oral viewer 200 through the connection mechanism 300 at the same time. During oral cleaning, the interdental brush 401, or the dental floss 402, or the toothbrush 403, or the object fetching clamp 405, or the object fetching hook 406 may be used for cleaning as needed while rinsing with water. Especially the operation process may be transmitted to various displays in real time. Under the condition of direct vision, accurate targeted cleaning is performed on food debris or various foreign substances in the oral cavity are taken out, thereby greatly improving the cleaning effect. Moreover, the use process is safer and more convenient.

The direction of a water column sprayed by the water pick 404 is substantially the same as the direction of the interdental brush 401 or the dental floss 402 entering tooth gaps.

In this way, while the brush head 401-1 of the interdental brush 401 or the line 402-1 of the dental floss 402 moves back and forth between the tooth gaps for cleaning, the water flow sprayed from the sprayer 404-1 can play a role in assisting in rinsing food debris at the tooth gaps.

In use, the electric toothbrush head 500 is first mounted on the toothbrush driving mechanism 14 of the main unit 100, and the electric toothbrush head 500 is used for cleaning the oral cavity over a large area. The electric toothbrush head 500 is then detached from the main unit 100, the oral viewer 200 is mounted on the main unit 100, and the cleaning situation in the oral cavity is observed through the oral viewer 200. For a part required for further targeted cleaning, the interdental cleaning appliance 400 such as the interdental brush 401, or the dental floss 402, or the toothbrush 403, or the water pick 404, or the object fetching clamp 405, or the object fetching hook 406 is mounted at the front end 200-1 of the oral viewer 200 according to the situations. Under the observation of the observation system 24 of the oral viewer 200, a part, such as a tooth gap, required for further targeted cleaning is further cleaned by using the interdental cleaning appliance 400.

The multi-functional visual electric toothbrush of the present disclosure includes a main unit 100, an oral viewer 200, an interdental cleaning appliance 400 and an electric toothbrush head 500. The oral viewer 200 is connected to the main unit 100, the interdental cleaning appliance 400 is connected to a front end 200-1 of the oral viewer 200, and the electric toothbrush head 500 is connected to a toothbrush driving mechanism 14 and is mounted on the main unit 100. A circuit system 12 and a control system 13 of the main unit 100 can not only transfer the energy of a power supply 11 to the toothbrush driving mechanism 14, so as to drive the electric toothbrush head 500 to work for large-area oral cleaning, but also connect a lighting system 23, an observation system 24 and a switch 26 of the oral viewer 200 to control the oral viewer 200 to work. The interdental cleaning appliance 400 may be used cooperatively with the oral viewer 200 to perform targeted cleaning on difficult-to-clean food debris in an oral cavity. A multi-functional visual electric toothbrush of the present disclosure not only has the large-area and high-efficiency cleaning ability of an electric toothbrush, but also can use a special tool such as an interdental brush, dental floss, a toothbrush, a water pick, an object fetching clamp and an object fetching hook to accurately perform targeted cleaning on difficult-to-clean parts such as tooth gaps under visual conditions.

BRIEF DESCRIPTION OF THE DRAWINGS

FIG. 1-1 is a three-dimensional schematic structural view of the back of FIG. 1.

FIG. 1-2 is a three-dimensional schematic structural view of a multi-functional visual electric toothbrush of the present disclosure when an oral viewer combined with dental floss and a water pick is connected to a main unit.

FIG. 1-3 is a three-dimensional schematic structural view of the back of FIG. 1-2.

FIG. 1-4 is a three-dimensional schematic structural view when dental floss is detached from an oral viewer.

FIG. 1-5 is an exploded view of a multi-functional visual electric toothbrush of the present disclosure, in which an oral viewer and related interdental cleaning appliances, as well as an electric toothbrush head may be detachably mounted on a main unit of the multi-functional visual electric toothbrush of the present disclosure.

FIG. 1-6 is a mounting schematic structural view of a multi-functional visual electric toothbrush of the present disclosure.

FIG. 2 is a front view of FIG. 1.

FIG. 2-1 is an A-A sectional view of FIG. 2.

FIG. 3 is a front view when an oral viewer including a water pick is mounted on a main unit.

FIG. 3-1 is a B-B sectional view of FIG. 3.

FIG. 4 is a three-dimensional schematic structural view when an oral viewer including an interdental brush is connected to a main unit.

FIG. 4-1 is a schematic structural view when an interdental brush is detached from an oral viewer.

FIG. 4-2 is a front view of FIG. 4.

FIG. 4-3 is a C-C sectional view of FIG. 4-2.

FIG. 4-4 is a D-D sectional view of FIG. 4-2.

FIG. 5 is a three-dimensional schematic structural view including a toothbrush.

FIG. 5-1 is a three-dimensional schematic structural view when a toothbrush is detached from an oral viewer.

FIG. 6 is a three-dimensional schematic structural view including an object fetching clamp.

In the above drawings:

Figure 1:
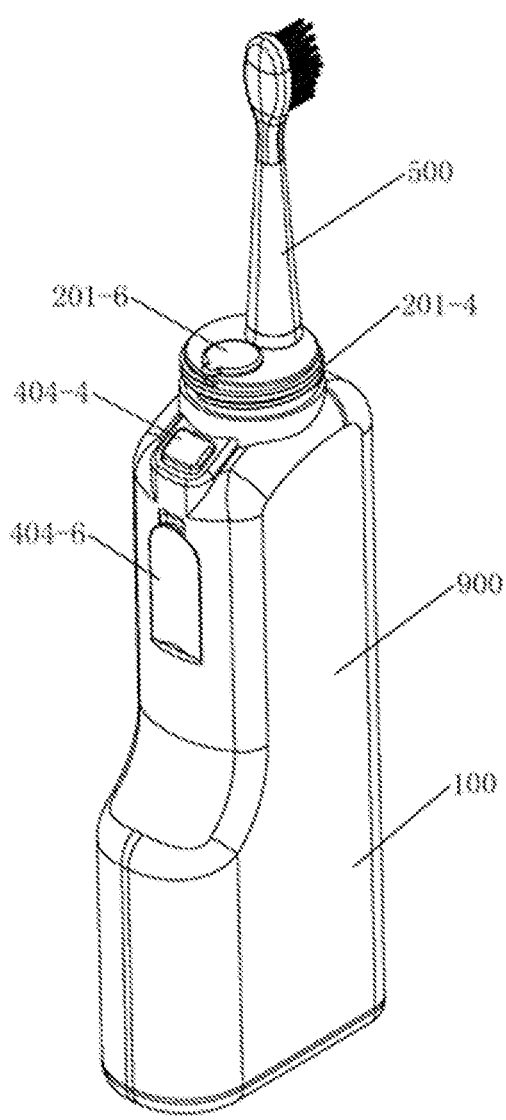
FIG. 1 is a three-dimensional schematic structural view of a multi-functional visual electric toothbrush of the present disclosure when an electric toothbrush head is connected to a main unit.
Figure 1:
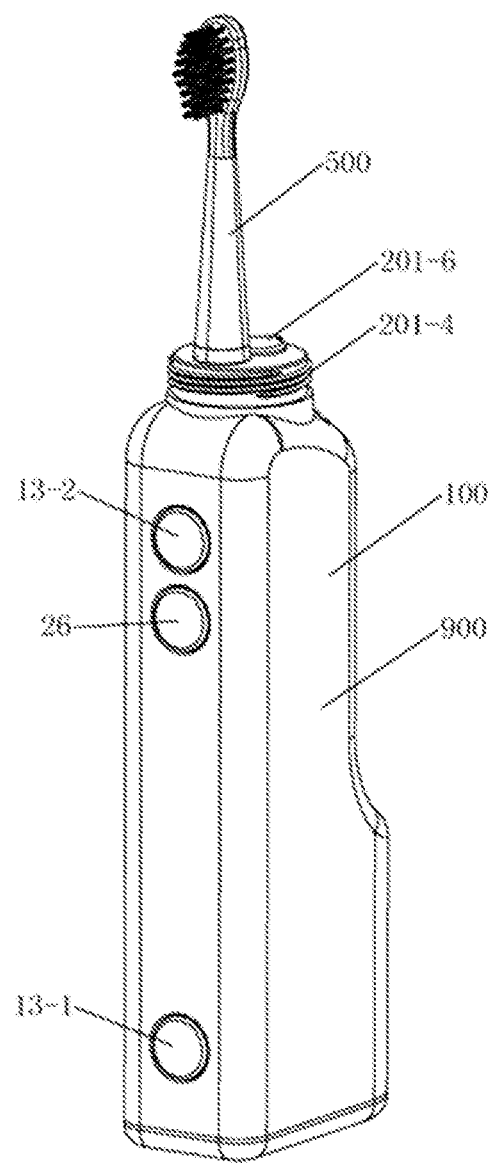

100. main unit, 200. oral viewer, 300. connection mechanism, 400. interdental cleaning appliance, 500. electric toothbrush head, 900. multi-functional visual electric toothbrush of the present disclosure.

200-1. front end of the oral viewer.

201. detachable threaded connection mechanism, 201-1. threaded upper cover, 201-2. waterway port, 201-3. circuit port, 201-4. threaded base, 201-5. seal ring, 201-6. seal cover, 201-7. transfer shaft mounting hole.

On the Main Unit:

11. power system, 12. circuit system, 13. control system, 14. toothbrush driving mechanism, 15. housing.

13-1. power switch, 13-2. toothbrush driving switch.

14-1. vibration generating device, 14-2. vibration transferring device, 14-2-1. transfer shaft connecting portion, 14-2-11. connection groove, 14-2-12. rotation stopping convex step, 14-2-13. connection shaft.

15-1. electrical mounting space, 15-2. water and waterway mounting space, 15-3. air intake hole, 15-2-1. partition plate, 15-2-11. water tank mounting space, 15-2-12. pressurizing device mounting space.

On the Oral Viewer:

21. housing, 23. lighting system, 24. observation system, 26. switch.

24-1. camera system.

24-1-1. camera, 24-1-2. data processing and output system, 24-1-3. display.

24-1-31. smart phone, 24-1-32. computer, 24-1-33. liquid crystal display/television, 24-1-34. tablet computer.

On the Connection Mechanism:

31. positioning block for mounting a water pick on the oral viewer, 32. positioning slot for mounting a water pick on the oral viewer, 33. clamping block for mounting a water pick on the oral viewer.

On the Interdental Cleaning Appliance:

401. interdental brush, 402. dental floss, 403. toothbrush, 404. water pick, 405. object fetching clamp, 406. object fetching hook.

401-1. brush head, 401-2. slider, 401-3. elbow. 402-1. line. 403-1. bristle. 405-1. clamp head. 406-1. head of the object fetching hook.

404-1. sprayer, 404-2. water tank, 404-3. water pipe, 404-4. water spraying switch, 404-5. pressurizing device, 404-6. water filling nozzle.

404-51. electric pressurizing device.

404-51-1. electric air pressurizing device, 404-51-11. electric air compressor, 404-51-111. air intake system, 404-51-112. air compressor, 404-51-113. air filling pipe.

404-51-2. electric water pressurizing device, 404-51-21. submersible pump, 404-51-22. water pump, 404-51-211. water intake system, 404-51-212. pressurizing system, 404-51-213. drainage system, 404-51-221. water suction system, 404-52-222. negative pressure suction system, 404-52-223. drainage system.

On the Electric Toothbrush Head:

51. elastic connection piece, 52. mounting slot.

DESCRIPTION OF EMBODIMENTS

Embodiment 1: A Multi-Functional Visual Electric Toothbrush of the Present Disclosure Referring to FIG. 1 to FIG. 4-4, the multi-functional visual electric toothbrush of the present disclosure includes a main unit 100, an oral viewer 200, an interdental cleaning appliance 400 and an electric toothbrush head 500. In the present embodiment, the interdental cleaning appliance 400 includes a water pick 404.

The main unit 100 includes a power system 11, a circuit system 12, a control system 13, a toothbrush driving mechanism 14 and a housing 15. A power switch 13-1 and a toothbrush driving switch 13-2 are arranged on the control system 13. The power switch 13-1 and the toothbrush driving switch 13-2 are arranged on the housing 15, referring to FIG. 1 and FIG. 1-1.

In the present embodiment, the toothbrush driving mechanism 14 adopts an electromagnetic vibration driving mechanism. The toothbrush driving mechanism 14 includes a vibration generating device 14-1 and a vibration transferring device 14-2 capable of transferring vibration generated by the vibration generating device 14-1. A proximal end of the vibration transferring device 14-2 is connected with the vibration generating device 14-1, and a distal end is connected with the electric toothbrush head 500, referring to FIG. 2 and FIG. 2-1.

In the present embodiment, the vibration generating device 14-1 is an electromagnetic vibration device, which may be an electromagnetic oscillator, or a magnetic suspension motor, or a piezoelectric transducer, or electromagnetic vibration devices of other forms. Here, the applicant does not enumerate them one by one, but they do not depart from the scope of protection of the present application.

Of course, the toothbrush driving mechanism 14 arranged in the main unit 100 may also be a motor-driven mechanically rotary toothbrush driving mechanism, which will not be specifically described herein by the applicant.

In the present embodiment, because the water pick 404 is included, the housing 15 of the main unit 100 is internally provided with two portions: an electrical mounting space 15-1 and a water and waterway mounting space 15-2. The power system 11, the circuit system 12 and the control system 13 are mounted in the electrical mounting space 15-1, referring to FIG. 2-1 and FIG. 3-1.

The power system 11, the control system 13 and the toothbrush driving mechanism 14 are connected together through the circuit system 12. The power system 11 can drive the toothbrush driving mechanism to work, so as to drive the electric toothbrush head 500 to work.

The oral viewer 200 includes a housing 21, a lighting system 23, an observation system 24 and a switch 26. The switch 26 is arranged on the housing 15 of the main unit 100.

The lighting system 23 and the observation system 24 are arranged at a front end 200-1 of the oral viewer 200.

Figure 8:
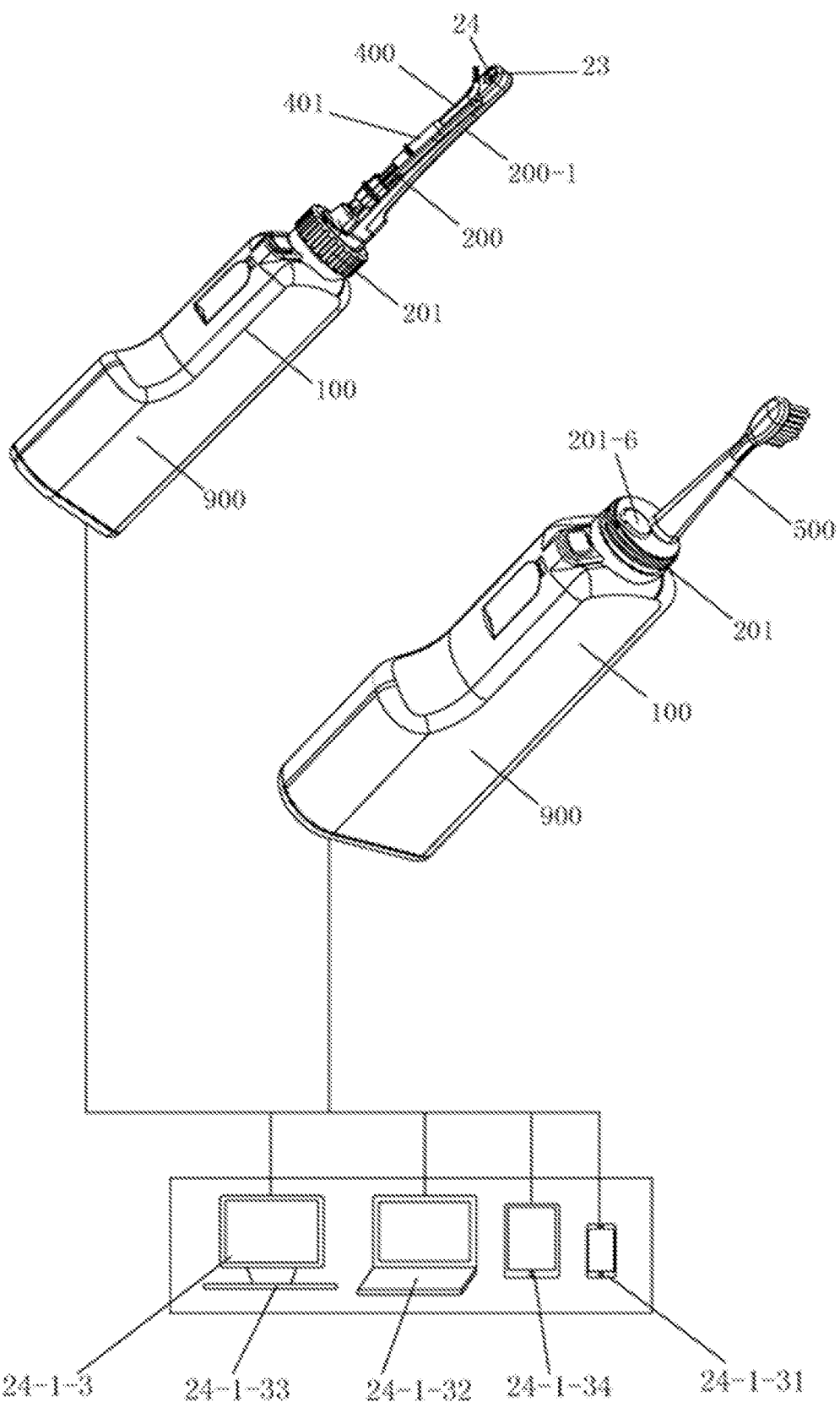
FIG. 8 is a schematic view when a multi-functional visual electric toothbrush of the present disclosure is connected with a display in a wired manner.
Figure 9:
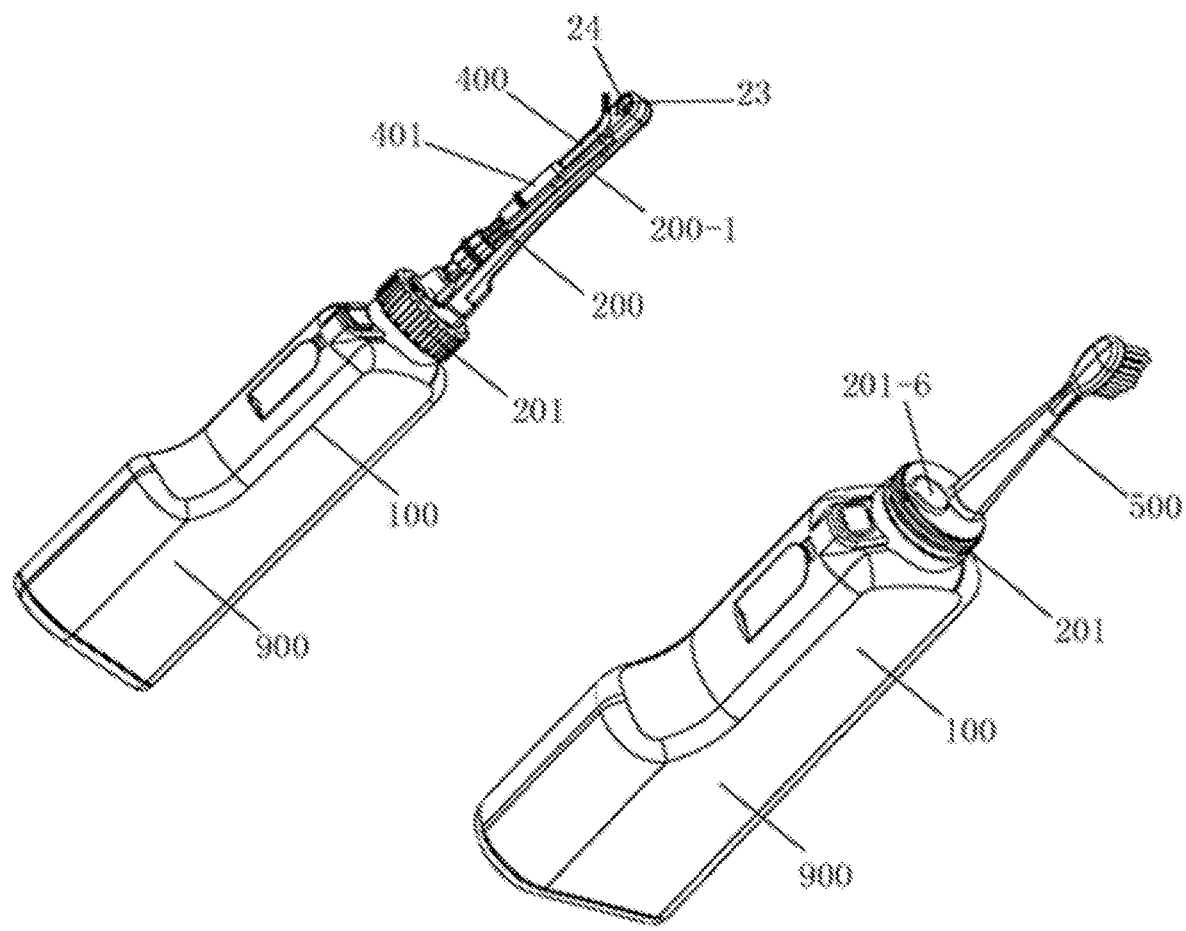
FIG. 9 is a schematic view when a multi-functional visual electric toothbrush of the present disclosure is connected with a display in a wireless manner.
Figure 9:
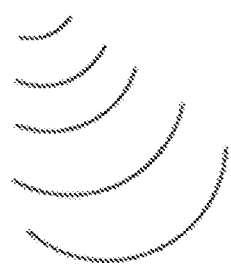
Figure 9:
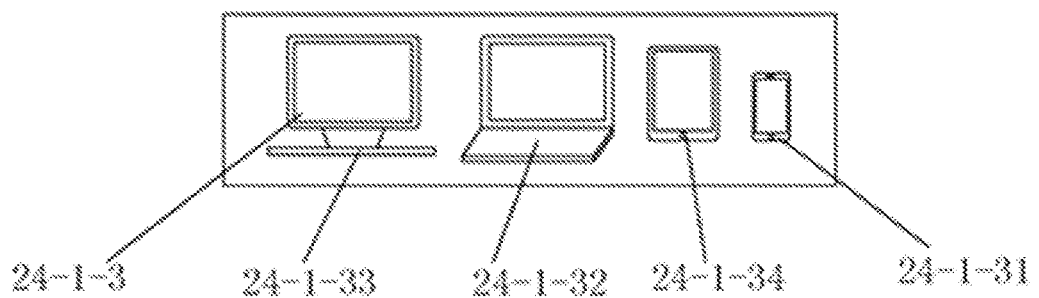

In the present embodiment, the observation system 24 is a camera system 24-1. The camera system 24-1 includes a camera 24-1-1, a data processing and output system 24-1-2 and a display 24-1-3. A picture shot by the camera 24-1-1 may be transmitted to the display 24-1-3 in time through the data processing and output system 24-1-2. The display 24-1-3 may be a smart phone 24-1-31, or a computer 24-1-32, or a liquid crystal display/television 24-1-33, or a tablet computer 24-1-34, referring to FIG. 8 and FIG. 9.

In the present embodiment, the front end 200-1 of the oral viewer 200 is detachably connected to the main unit 100 in a threaded connection manner through a detachable threaded connection mechanism 201.

The detachable threaded connection mechanism 201 includes a threaded upper cover 201-1, a waterway port 201-2, a circuit port 201-3 and a threaded base 201-4. Seal rings 201-5 are arranged at the waterway port 201-2 and the circuit port 201-3, so as to prevent sewage in a cleaning process from entering a circuit or a waterway, referring to FIG. 1-5 and FIG. 1-6.

The circuit system 12 and the control system 13 can also connect the lighting system 23, the observation system 24, the power system 11 and the switch 26 together, and the power system 11 can drive the lighting system 23 and the observation system 24 of the oral viewer 200 to work, so as to control the oral viewer 200 to work.

Therefore, in the present application, the main unit 100 can not only drive the electric toothbrush head 500, but also provide power and control systems for the lighting system 23, the observation system 24 and the like of the oral viewer 200, and transmit a picture shot by the camera 24-1-1 of the observation system 24 to the display 24-1-3, such as a smart phone 24-1-31, of the observation system 24 in time, so that the interdental cleaning process and cleaning effect of the interdental cleaning appliance 400 can be observed on a mobile phone immediately while cleaning, thereby achieving the purpose of thoroughly cleaning teeth and tooth gaps.

In the present embodiment, the electric toothbrush head 500 is detachably mounted at a distal end of the vibration transferring device 14-2. The detachable mounting manner may facilitate the detachment of the electric toothbrush head 500 from the main unit 100 for replacement, storage and carrying. In particular, in a detachable mounting manner, when it is necessary to use the interdental cleaning appliance 400 for further cleaning, the electric toothbrush head 500 may be detached from the main unit and replaced with the interdental cleaning appliance 400. It is more convenient for a user to use the interdental cleaning appliance 400 for further cleaning.

In the present embodiment, the electric toothbrush head 500 is detachably mounted on the vibration transferring device 14-2 in a concave-convex engaging connection manner. The vibration transferring device 14-2 includes a transfer shaft connecting portion 14-2-1, and the transfer shaft connecting portion 14-2-1 is provided with a connection groove 14-2-11, a rotation stopping convex step 14-2-12 and a connection shaft 14-2-13. An elastic connection piece 51 and a mounting slot 52 are arranged at the bottom of the electric toothbrush head 500. The shape of the mounting slot 52 is matched with the outer contour of the transfer shaft connecting portion 14-2-1. During connection, the mounting slot 52 of the electric toothbrush head 500 is aligned with the transfer shaft connecting portion 14-2-1 and is pressed down slightly, the elastic connection piece 51 elastically deforms outward under the action of the connection shaft 14-2-13, the transfer shaft connecting portion 14-2-1 starts to enter the mounting slot 52 and continues to press down until reaching the connection groove 14-2-11, the external force of the elastic connection piece 51 is removed, and the elastic connection piece 51 restores to an original state and abuts against the interior of the connection groove 14-2-11, so that the electric toothbrush head 500 may be prevented from disengaging from the vibration transferring device 14-2. When the electric toothbrush head 500 is detached, the electric toothbrush head 500 may be pulled up forcefully, referring to FIG. 1-5 to FIG. 2-1.

Of course, the electric toothbrush head 500 may also be detachably mounted on the vibration transferring device 14-2 in other manners such as an interference fit connection manner or a rotary connection manner. Here, the applicant will no longer enumerate one by one.

When it is necessary to use the electric toothbrush head 500 to brush teeth over a large area, the front end 200-1 of the oral viewer 200 is detached from the main unit 100, the electric toothbrush head 500 is mounted on the vibration transferring device 14-2 of the toothbrush driving mechanism 14, and the main unit 100 drives the electric toothbrush head 500 to work through the toothbrush driving mechanism 14. When it is necessary to further perform targeted cleaning on difficult-to-clean parts such as tooth gaps in the oral cavity, the electric toothbrush head 500 is detached from the vibration transferring device 14-2, the front end 200-1 of the oral viewer 200 is mounted on the main unit 100, the oral cavity cleaning situation may be observed through the oral viewer 200, and the interdental cleaning appliance 400 is mounted on the oral viewer 200 for targeted cleaning as needed. After use, the oral viewer 200, the interdental cleaning appliance 400 and the electric toothbrush head 500 may all be detached from the main unit, which facilitates separate storage and cleaning.

Figures 1, 2:
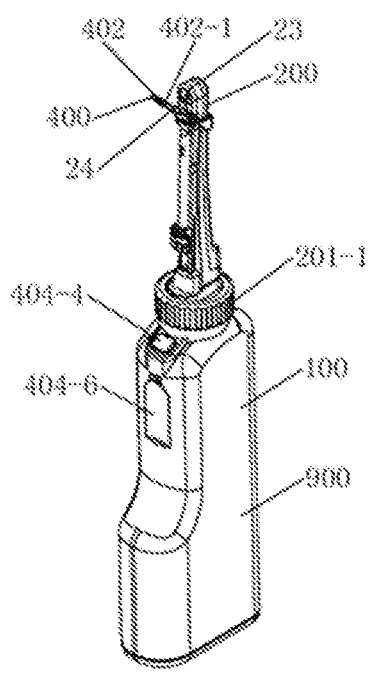
Figures 1, 2, 3:
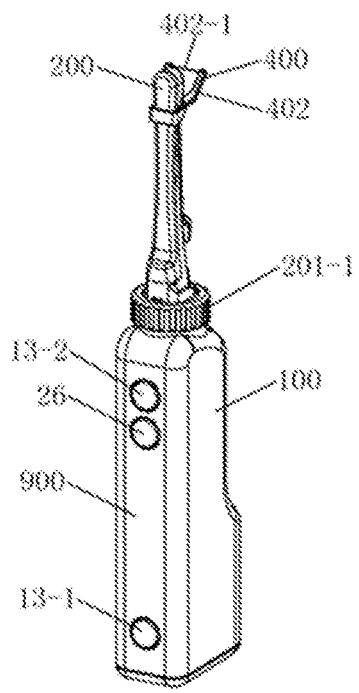

Referring to FIG. 2-1 and FIG. 3-1, in the present embodiment, the interdental cleaning appliance includes a water pick 404. The water pick 404 includes a sprayer 404-1, a water tank 404-2, a water pipe 404-3, a water spraying switch 404-4 and a pressurizing device 404-5. In the present embodiment, the sprayer 404-1 is disposed in the housing 21 at the front end 200-1 of the oral viewer 200. The water tank 404-2 and the pressurizing device 404-5 are mounted in the water and waterway mounting space 15-2 of the housing 15 of the main unit 100. The sprayer 11 is mounted near the observation system 24 at the front end 200-1 of the oral viewer 200 to ensure that the water flow sprayed by the sprayer 11 may be maintained in the visual field of the observation system 24, so that the cleaning effect of the water pick 404 in the oral cavity is conveniently observed.

In the present embodiment, the pressurizing device 404-5 is an electric pressurizing device 404-51. The electric pressurizing device 404-51 is an electric water pressurizing device 404-51-2. The electric water pressurizing device 404-51-2 is a submersible pump 404-51-21, referring to FIG. 2-1 and FIG. 3-1.

The submersible pump 404-51-21 includes a water intake system 404-51-211, a pressurizing system 404-51-212 and a drainage system 404-51-213.

The submersible pump 404-51-21 is mounted at the bottom of the water tank 404-2, the drainage system 404-51-213 is connected with the water pipe 404-3, after the power system 11 supplies power to the submersible pump 404-51-21, the pressurizing system 404-51-212 works to pressurize water entering the submersible pump 404-51-21 through the water intake system 404-51-211, the water spraying switch 404-4 is turned on, and the pressurized water may be sprayed out, by means of the drainage system 404-51-213, from the sprayer 11 after passing through the water pipe 404-3 to rinse teeth, referring to FIG. 2-1.

The water tank 404-2 is further provided with a water filling nozzle 404-6, and water may be refilled into the water tank 404-2 through the water filling nozzle 404-6.

Because the sprayer 11 of the water pick 404 is disposed in the housing 21 at the front end 200-1 of the oral viewer 200 in the present embodiment, the front end of the oral viewer 200 may also be further combined and used cooperatively with other interdental cleaning appliances 400 such as the interdental brush 401, or the dental floss 402, or the toothbrush 403, or the object fetching clamp 405, or the object fetching hook 406. During oral cleaning, other interdental cleaning appliances such as the interdental brush 401, or the dental floss 402, or the toothbrush 403, or the object fetching clamp 405, or the object fetching hook 406 may be simultaneously used for cleaning as needed while rinsing with water. Especially the operation process may be transmitted to various displays in real time. Under the condition of direct vision, accurate targeted cleaning is performed on food debris or various foreign substances in the oral cavity are taken out, thereby greatly improving the cleaning effect. Moreover, the use process is safer and more convenient.

Figures 1, 2, 3, 4:
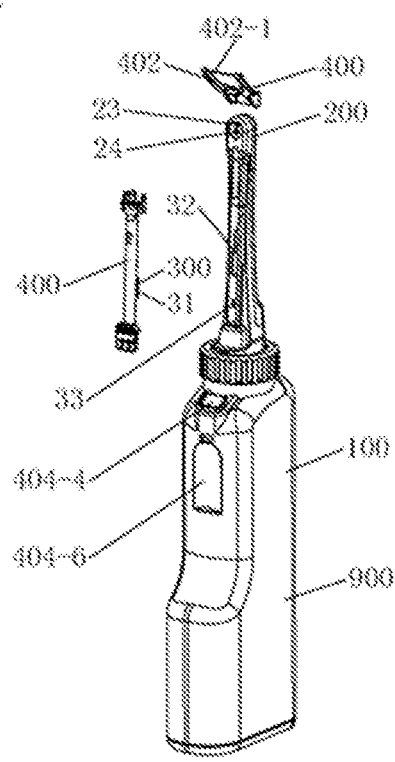

Referring to FIG. 4 to FIG. 4-4, the front end 200-1 of the oral viewer 200 is combined with the interdental brush 401. The interdental brush 401 is detachably mounted at the front end 200-1 of the oral viewer 200 through a connection mechanism 300.

The connection mechanism 300 may be an independent component and may be arranged on the interdental brush 401 or on the oral viewer 200; or a part of the detachable mechanical connection mechanism may be arranged on the interdental brush 401, and the other part is arranged on the oral viewer 200 to form a combined mechanical connection mechanism.

In the present embodiment, the connection mechanism 300 adopts a concave-convex engaging connection, and the connection mechanism 300 may also adopt a sliding chute connection, a pin connection, a key connection, a threaded connection, a screw connection, a buckle connection, a hook connection, an interference fit connection, or the like. Persons skilled in the art may perform various specific product designs according to the technical solutions disclosed in the present disclosure without departing from the scope of protection of the present patent.

In the present embodiment, a positioning slot 32 and a clamping block 33 capable of being connected with the interdental brush 401 are arranged on the housing 21 of the oral viewer 200; an inverted T-shape positioning block 31 on the interdental brush 401 can be embedded into the positioning slot 32, and the clamping block 33 can stop the interdental brush 401 from sliding backward; and the positioning block 31, the positioning slot 32 and the clamping block 33 cooperate to constitute the connection mechanism 300.

A brush head 401-1 of the interdental brush 401 is within a viewing field of the observation system 24. A slider 401-2 is arranged on the interdental brush 401, and by pushing the slider 401-2, the brush head 401-1 of the interdental brush 401 may be driven to move back and forth in an elbow 401-3 at the front end of the interdental brush 401.

Referring to FIG. 1-2 to FIG. 1-5, the front end 200-1 of the oral viewer 200 is combined with the dental floss 402. The dental floss 402 is mounted at the front end 200-1 of the oral viewer 200 through the connection mechanism 300. A line 402-1 of the dental floss 402 is within a viewing field of the observation system 24.

In the present embodiment, the direction of a water column sprayed by the water pick 404 is substantially the same as the direction of the interdental brush 401 or the dental floss 402 entering tooth gaps.

In this way, while the brush head 401-1 of the interdental brush 401 or the line 402-1 of the dental floss 402 moves back and forth between the tooth gaps for cleaning, the water flow sprayed from the sprayer 404-1 can play a role in assisting in rinsing food debris at the tooth gaps.

Figures 1, 2, 3, 4, 5:
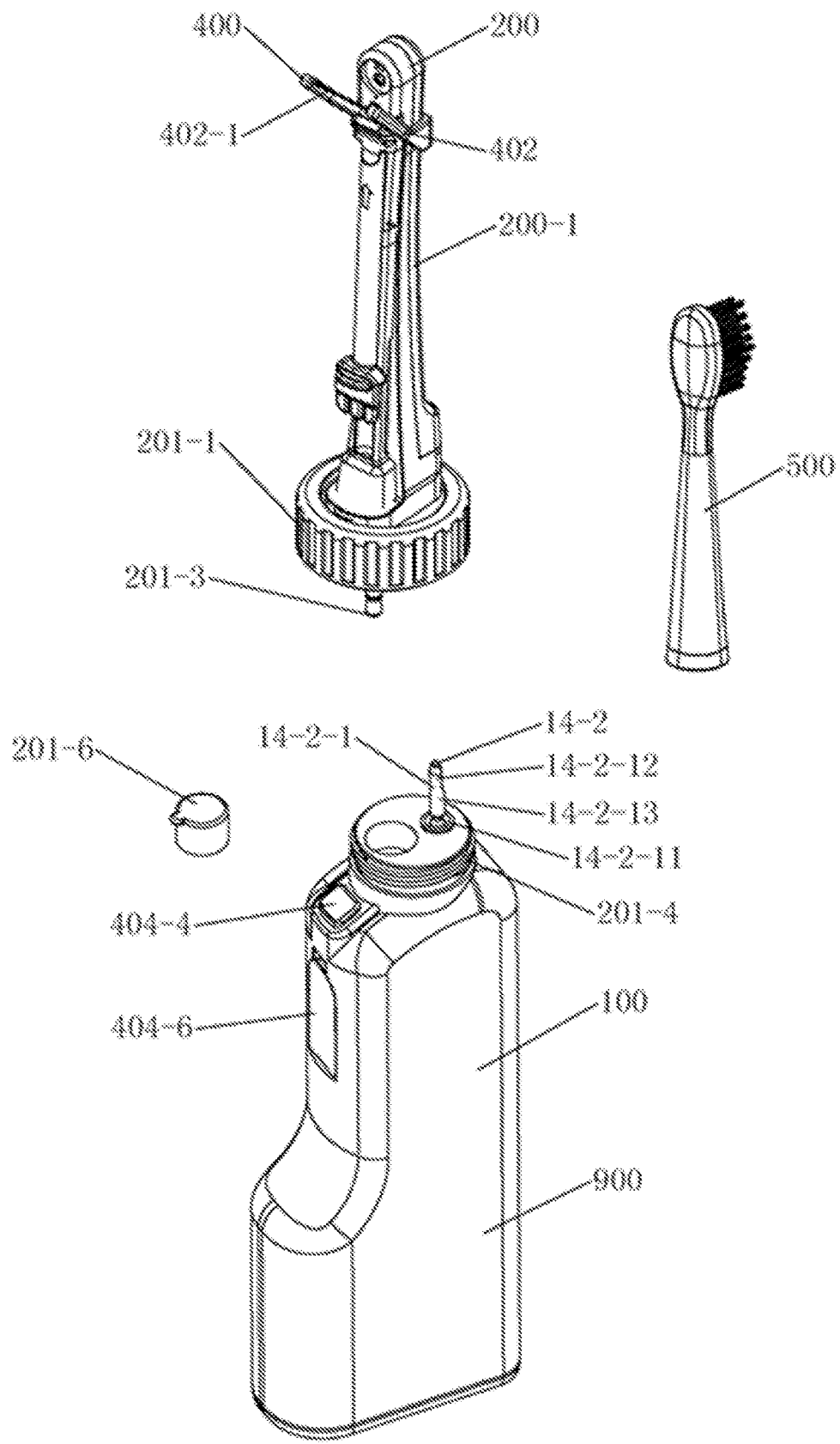
Figures 1, 2, 3, 4, 5, 6:
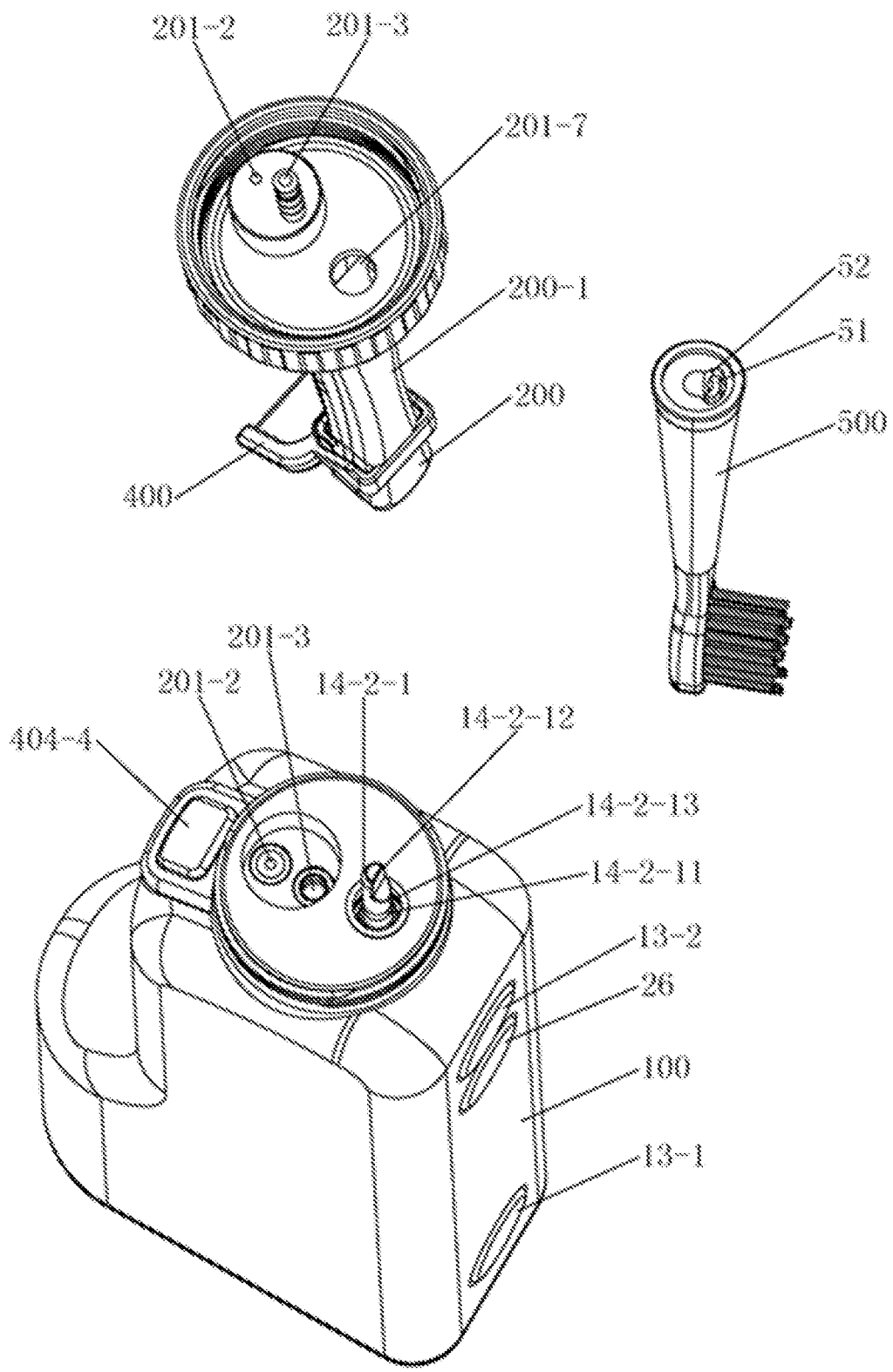
Figure 2:
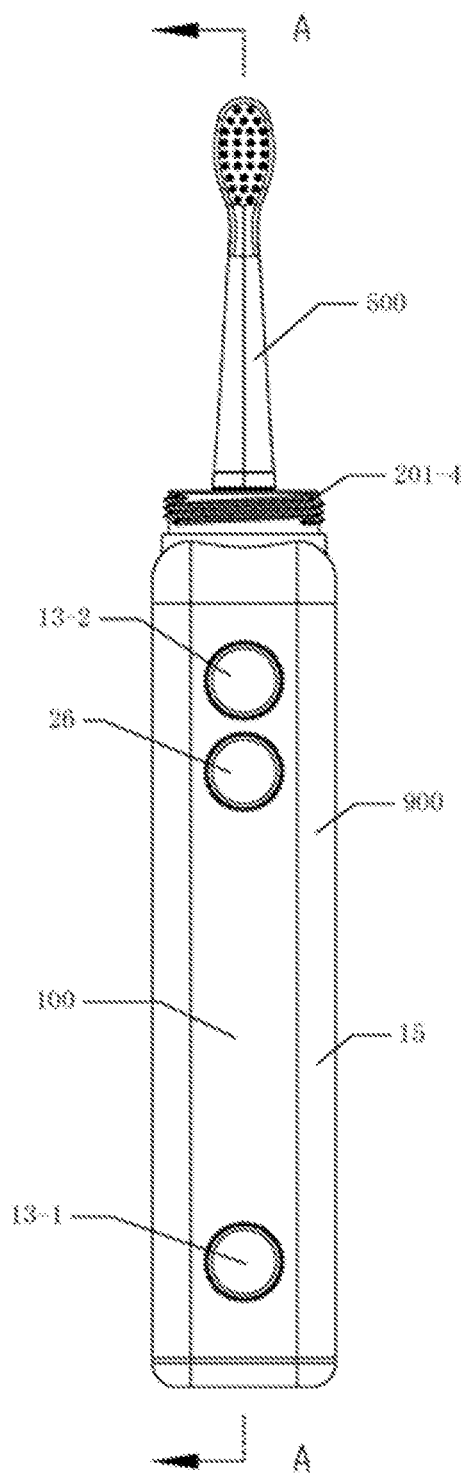
Figure 1:
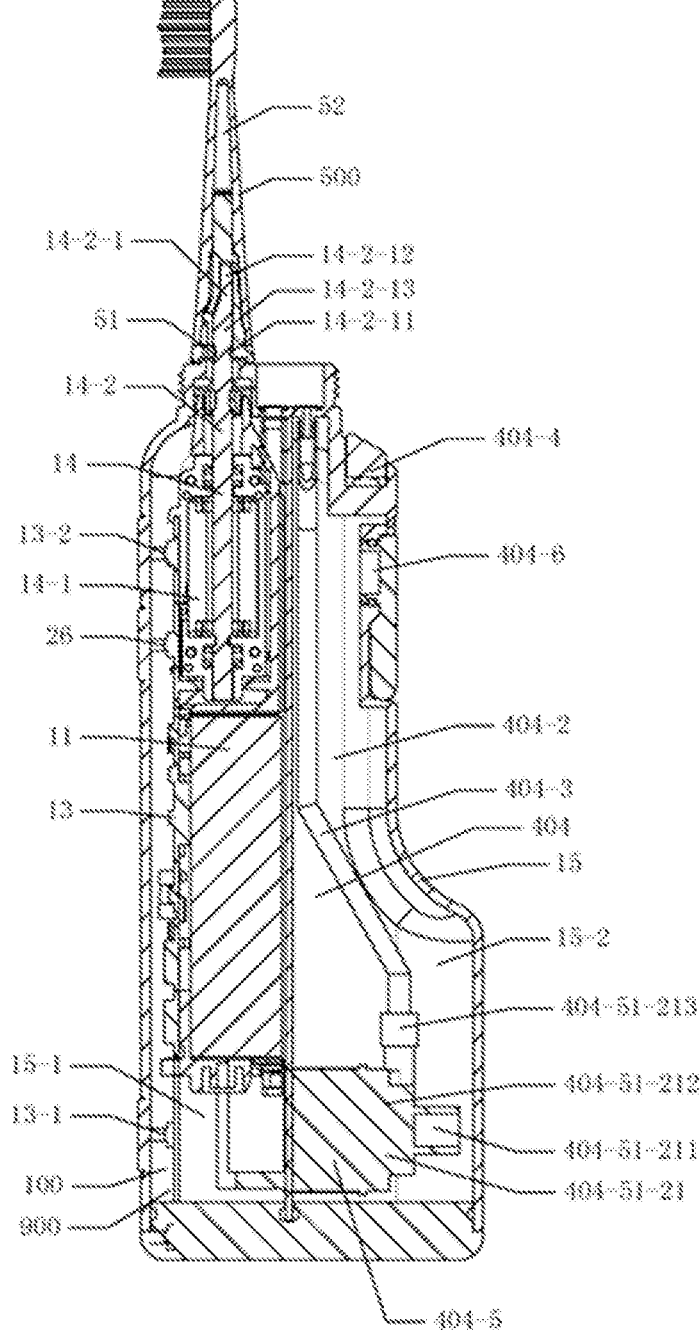
Figure 3:
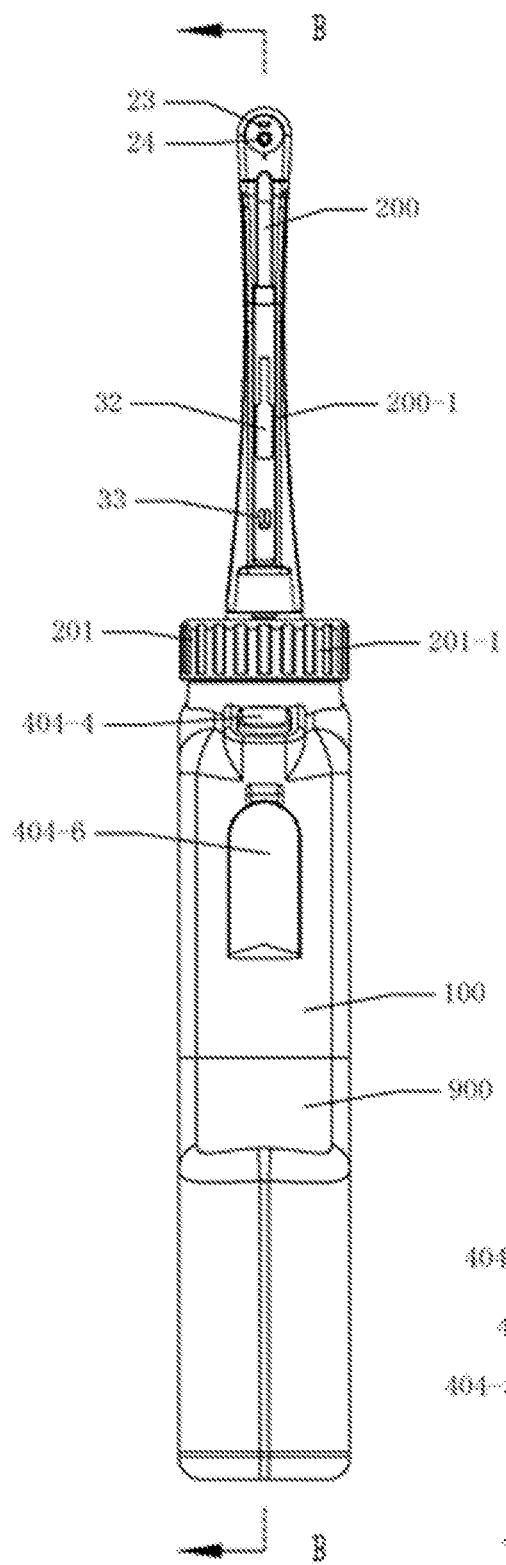
Figure 1:
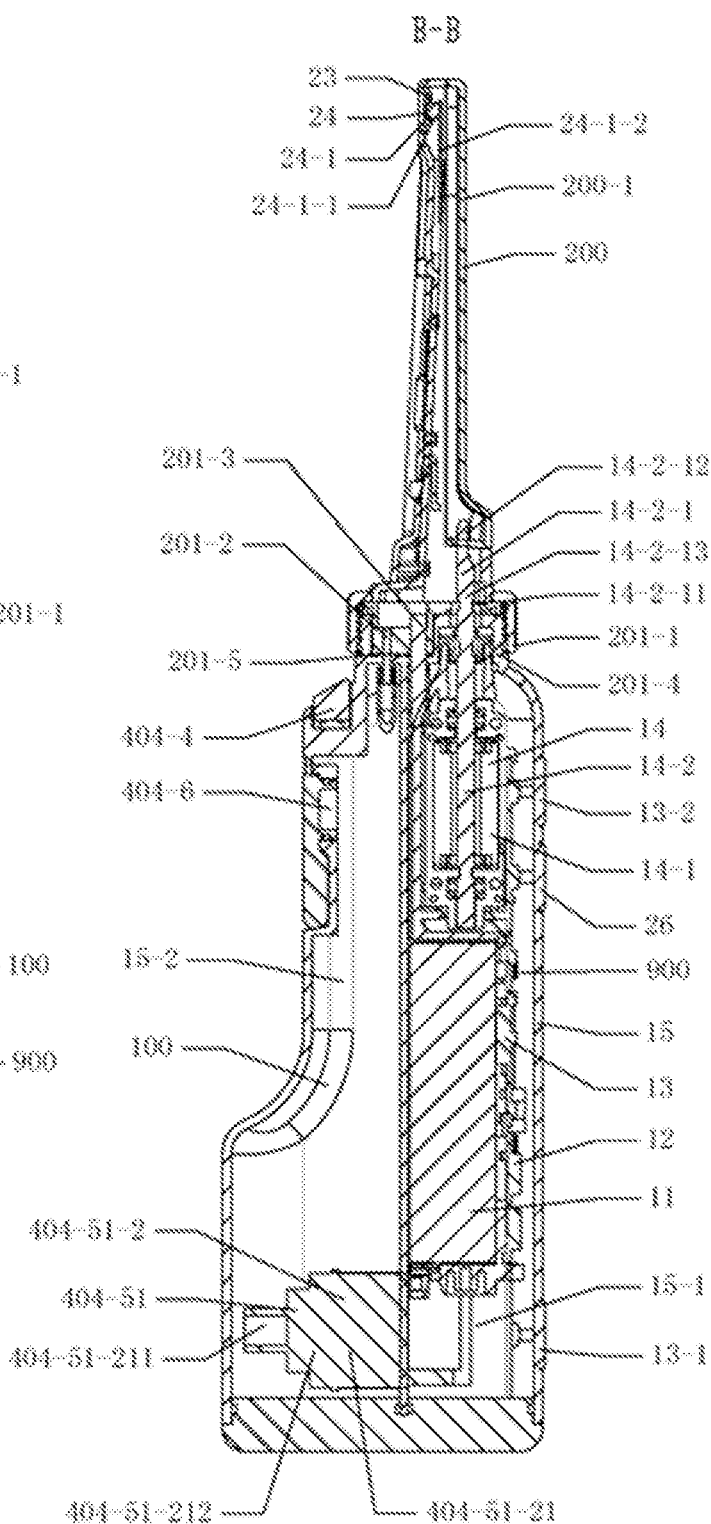
Figure 4:
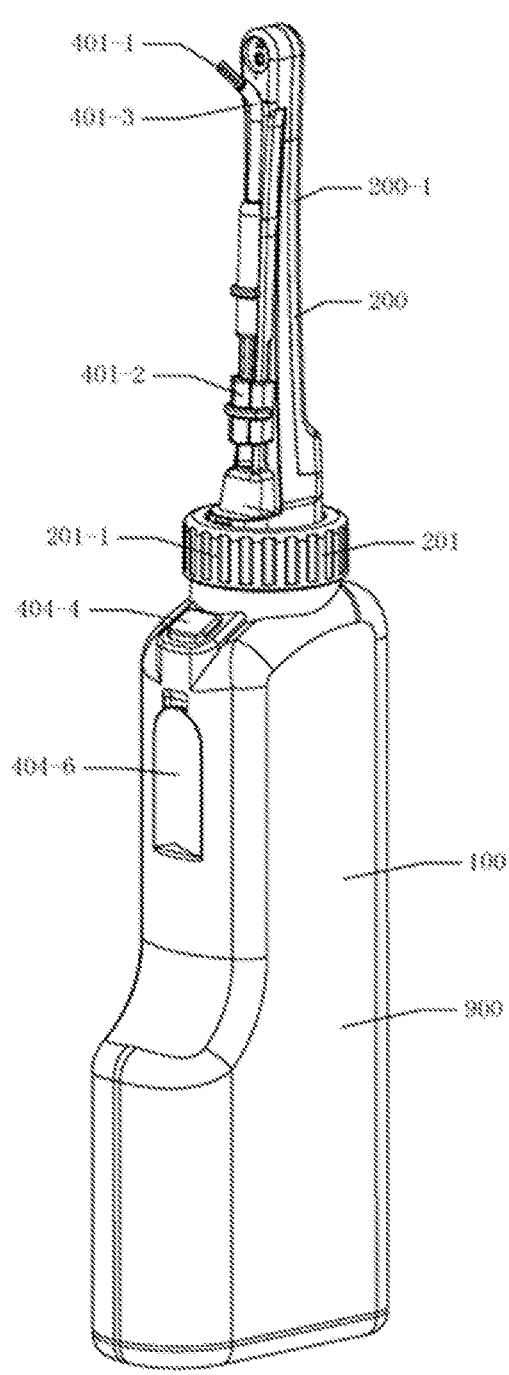
Figure 1:
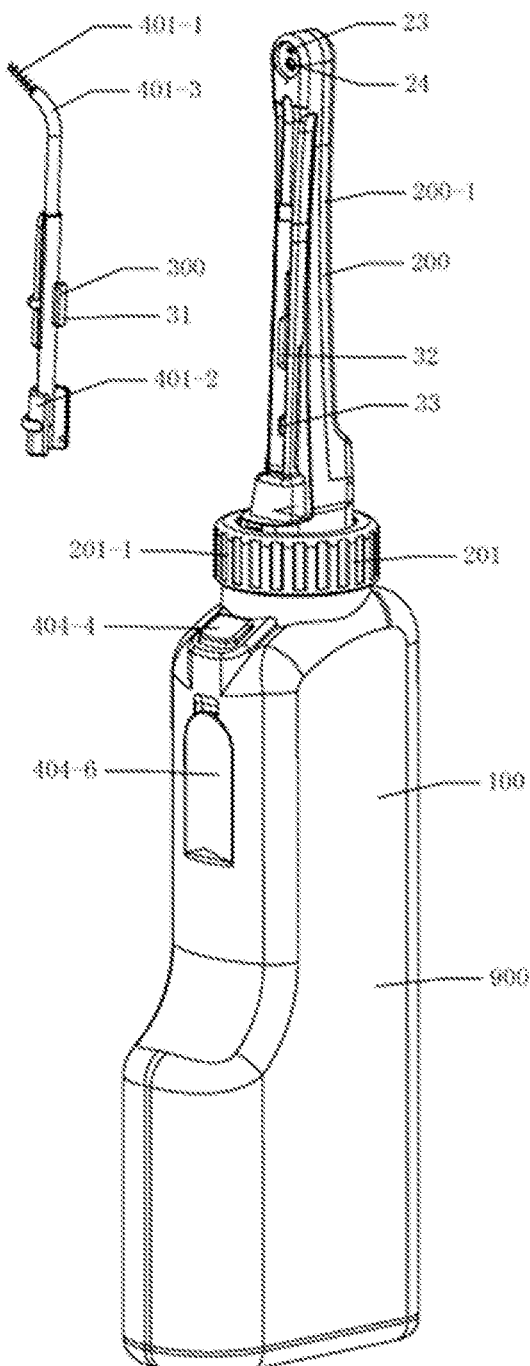
Figures 2, 4:
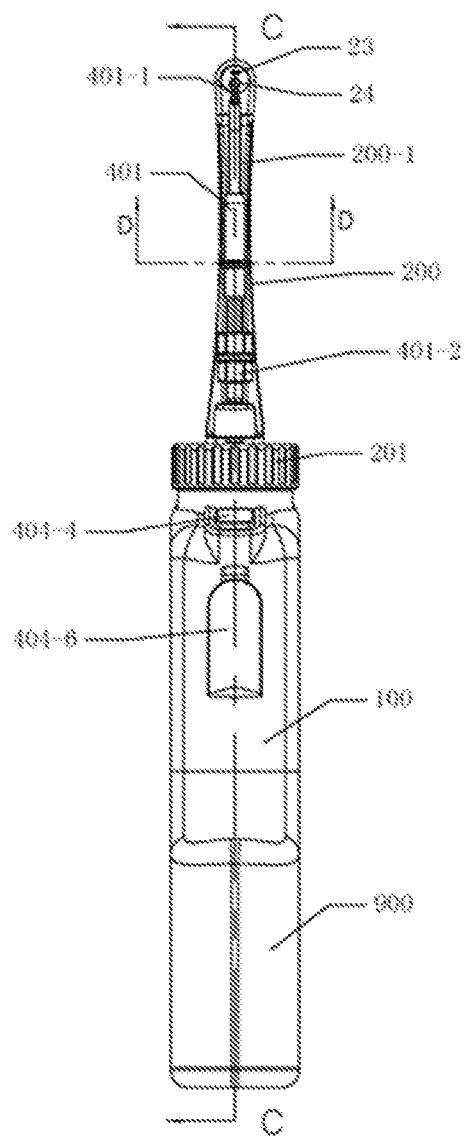
Figures 3, 4:
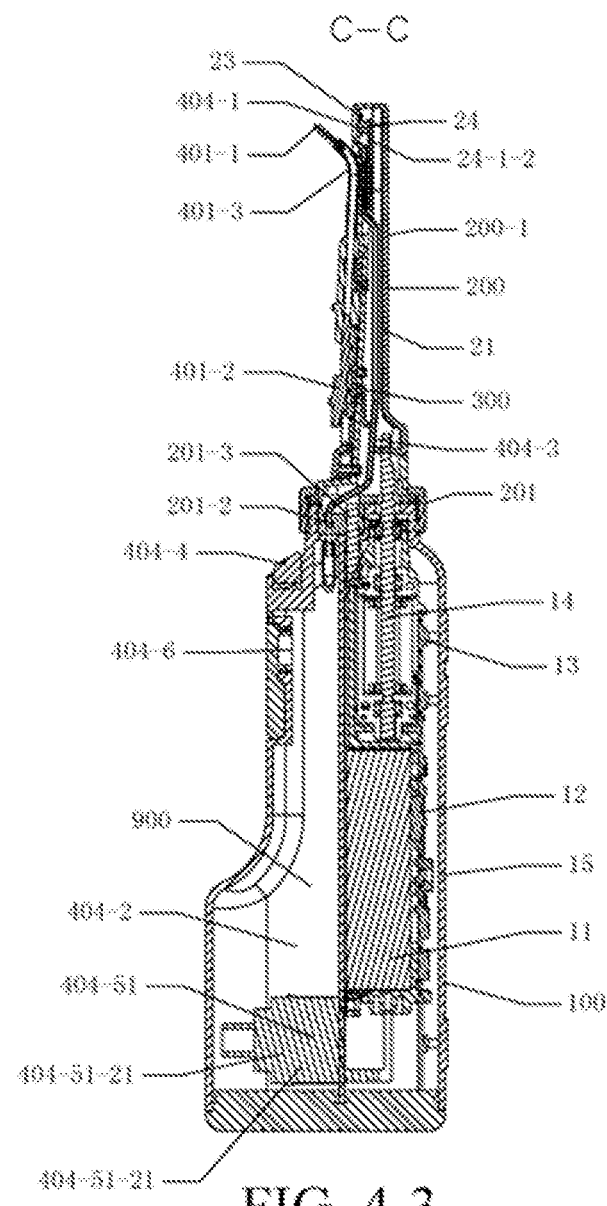
Figure 4:
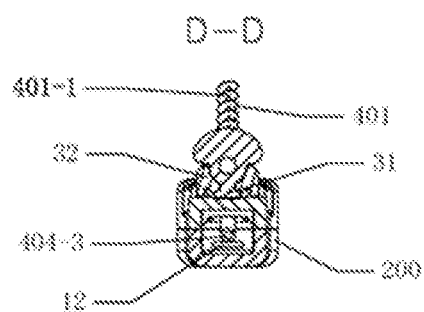
Figure 5:
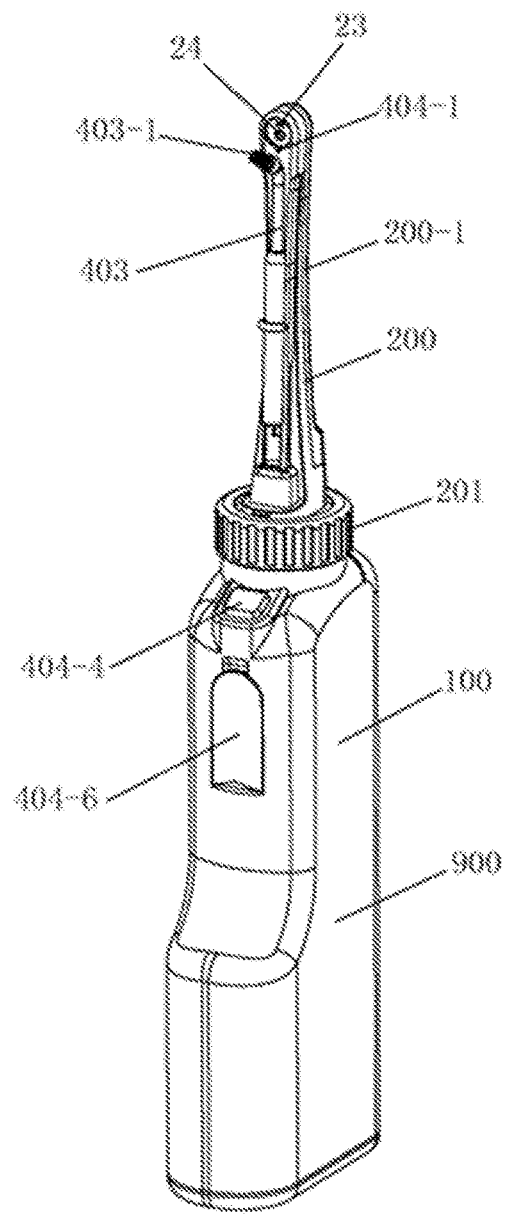
Figure 1:
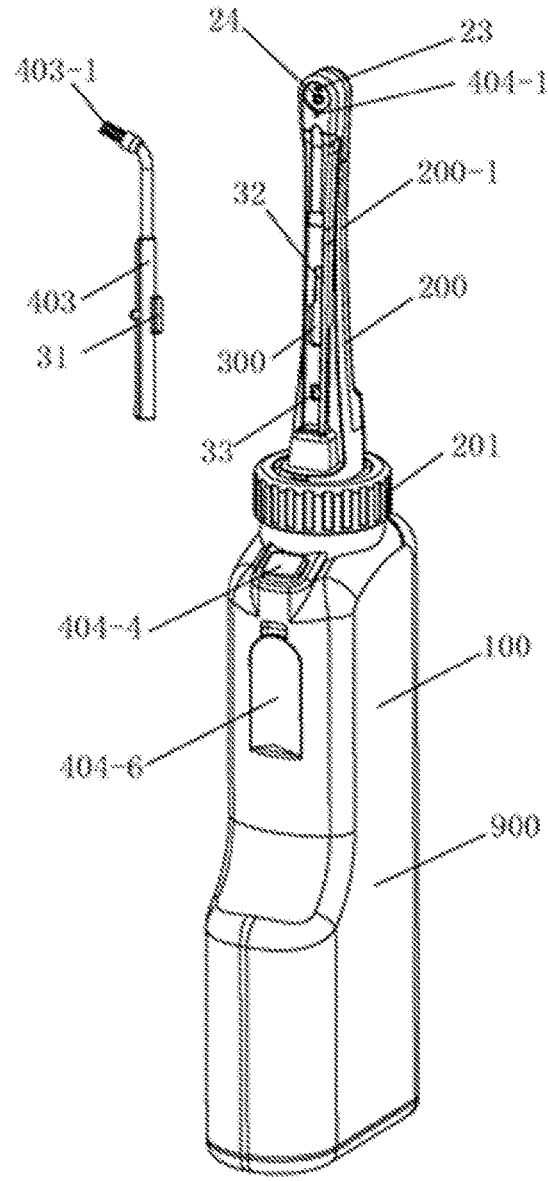
Figure 6:
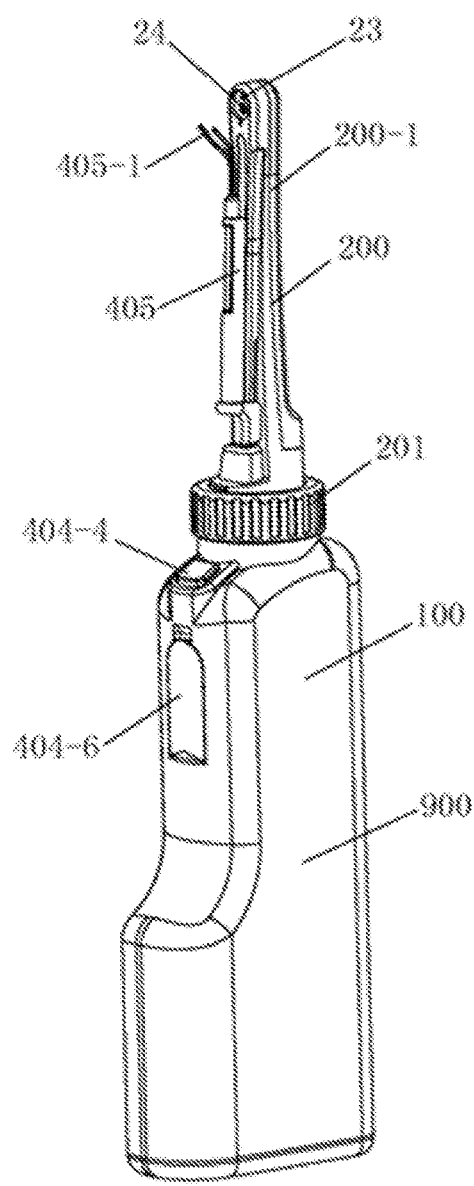
Figure 7:
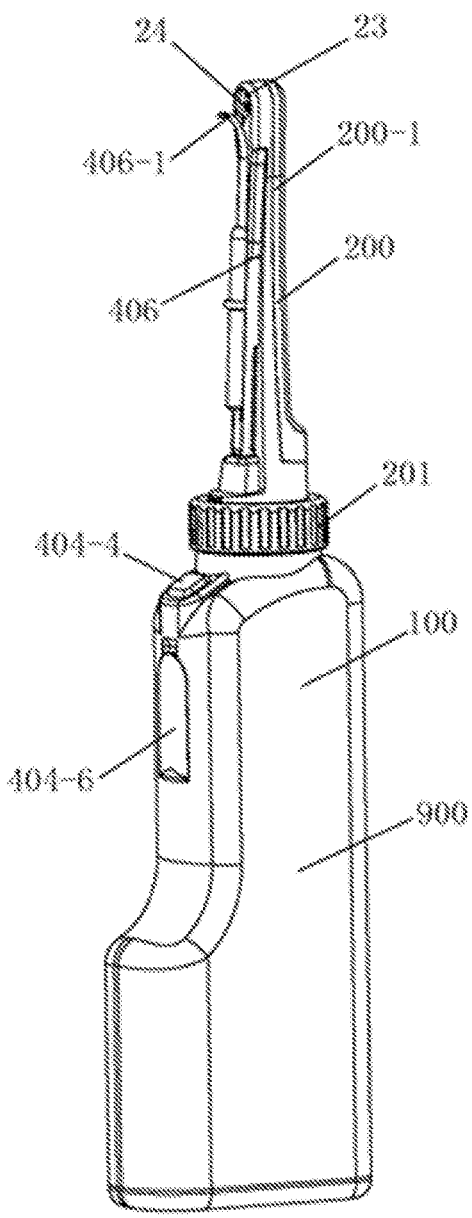
FIG. 7 is a three-dimensional schematic structural view including an object fetching hook.

In addition, referring to FIG. 5 to FIG. 7, the process of connecting the oral viewer 200 with the other interdental cleaning appliances 400 such as the toothbrush 403, the object fetching clamp 405 and the object fetching hook 406 through the connection mechanism 300 will not be described here, but it is only necessary to ensure that bristles 403-1 of the toothbrush 403, the water column sprayed by the water pick 404, a clamp head 405-1 of the object fetching clamp 405 and a head 406-1 of the object fetching hook 406 are within the viewing field of the observation system 24 so as to carry out direct observation in the cleaning process.

In use, the electric toothbrush head 500 is first mounted on the toothbrush driving mechanism 14 of the main unit 100, and after the power switch 13-1 is pressed down, the toothbrush driving switch 13-2 is pressed, so that the electric toothbrush head 500 may be used to clean the oral cavity over a large area. At this time, in order to prevent liquid or foam from accidentally entering the waterway port 201-2 or the circuit port 201-3 of the detachable threaded connection mechanism 201 during tooth brushing, it is necessary to cover the seal cover 201-6.

After the use of the electric toothbrush head 500, the toothbrush driving switch 13-2 and the power switch 13-1 are turned off, and then the electric toothbrush head 500 is pulled up forcefully, so that the electric toothbrush head 500 may be detached from the main unit 100. The transfer shaft connecting portion 14-2-1 of the vibration transferring device 14-2 is aligned with the transfer shaft mounting hole 201-7 in the detachable threaded connection mechanism 201 and aligned with the waterway port 201-2 and the circuit port 201-3, the threaded upper cover 201-1 is then rotated, the threaded upper cover 201-1 is connected to the threaded base 201-4, and the threaded upper cover 201-1 is tightened until the seal ring 201-5 forms a good seal, so that the oral viewer may be mounted on the main unit 100. At this time, the cleaning situation in the oral cavity may be observed through the oral viewer 200. If there is a part required for further targeted cleaning, the interdental cleaning appliance 400 such as the interdental brush 401, or the dental floss 402, or the toothbrush 403, or the water pick 404, or the object fetching clamp 405, or the object fetching hook 406 may be mounted at the front end 200-1 of the oral viewer 200 through the connection mechanism 300 according to the situations. Under the observation of the observation system 24 of the oral viewer 200, a part, such as a tooth gap, required for further targeted cleaning is further cleaned by using the interdental cleaning appliance 400.

A multi-functional visual electric toothbrush of the present disclosure not only has the large-area and high-efficiency cleaning ability of an electric toothbrush, but also can use a special tool such as an interdental brush, dental floss, a toothbrush, a water pick, an object fetching clamp and an object fetching hook to accurately perform targeted cleaning on difficult-to-clean parts such as tooth gaps under visual conditions.

In the present embodiment, the electric pressurizing device 404-51 is a submersible pump 404-51-21. In addition, the electric pressurizing device 404-51 may also be a water pump 404-51-22.

Figure 10:
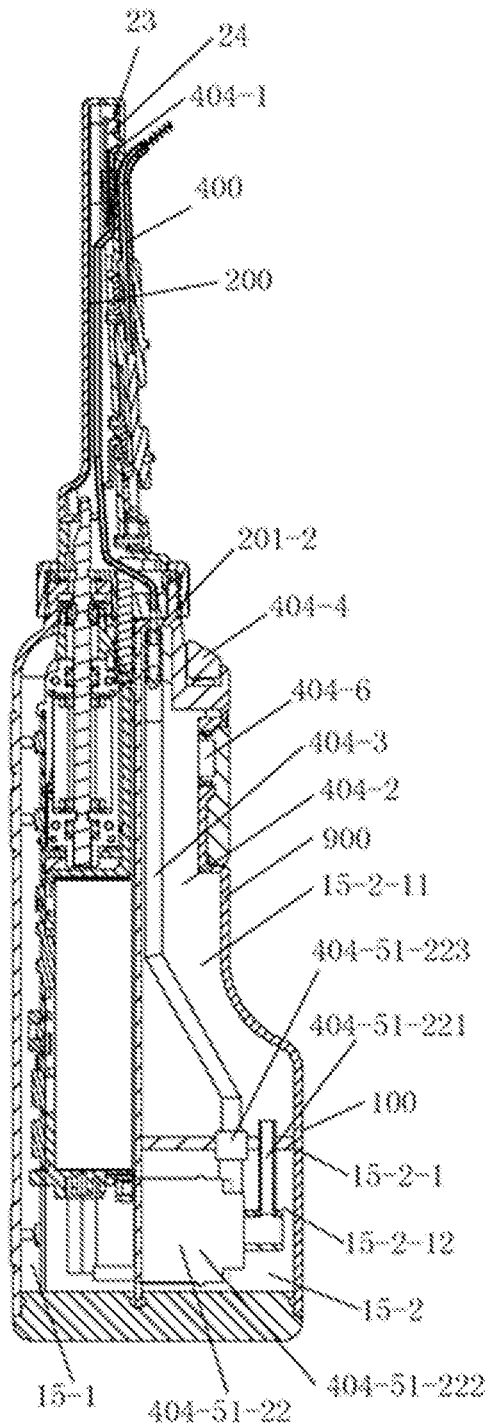
FIG. 10 is a schematic structural view of a multi-functional visual electric toothbrush including a water pump of the present disclosure.

Referring to FIG. 10, when the electric pressurizing device 404-51 is the water pump 404-51-22, a partition plate 15-2-1 is also arranged in the water and waterway mounting space 15-2 of the housing 15, the partition plate 15-2-1 partitions the water and waterway mounting space 15-2 into a water tank mounting space 15-2-11 and a pressurizing device mounting space 15-2-12.

The water pump 404-51-22 includes a water suction system 404-51-221, a negative pressure suction system 404-52-222 and a drainage system 404-52-223. The negative pressure suction system 404-52-222 is mounted in the pressurizing device mounting space 15-2-12 and is isolated from water, the water suction system 404-51-221 penetrates through the partition plate 15-2-1 and is arranged at the bottom of the water tank 404-2, and the drainage system 404-52-223 penetrates through the partition plate 15-2-1 and is then connected to the water pipe 404-3.

After the power system 11 is switched on and the power system 11 supplies power to the water pump 404-51-22, the negative pressure suction system 404-52-222 works, water in the water tank 404-2 is sucked into the water pump 404-51-22 through the water suction system 404-51-221 and is pressurized by the negative pressure suction system 404-52-222, the water spraying switch 404-4 is then turned on, and the pressurized water may be sprayed out, by means of the drainage system 404-52-223, from the sprayer 11 after passing through the water pipe 404-3 to rinse teeth.

Figure 11:
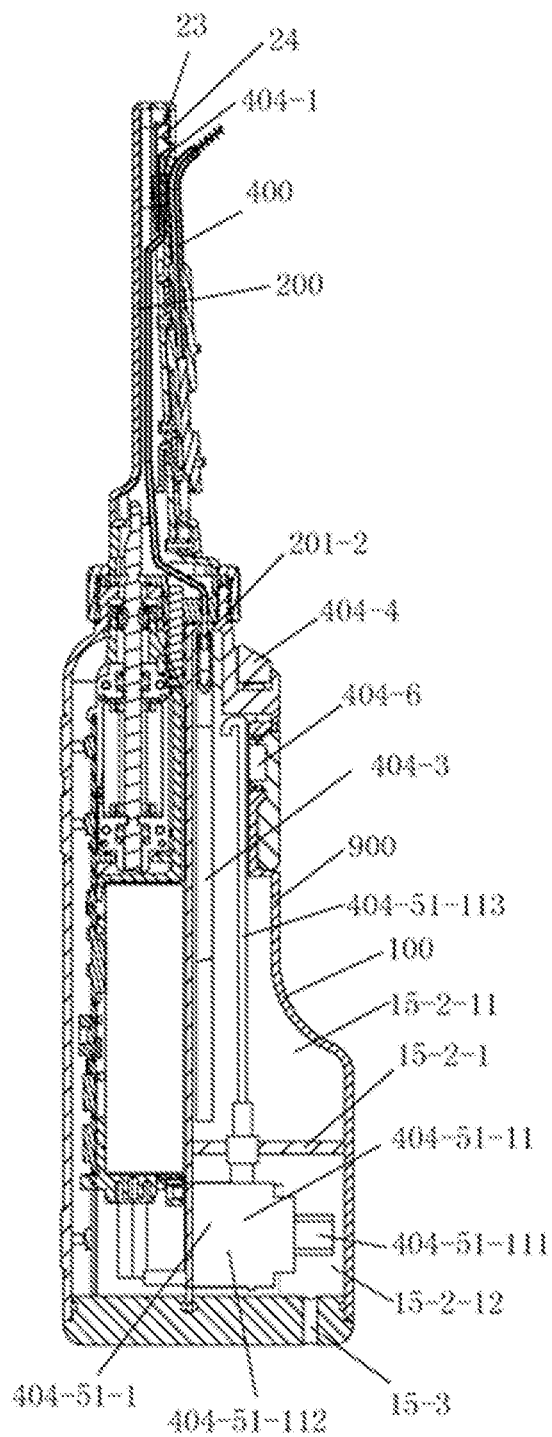
FIG. 11 is a schematic structural view of a multi-functional visual electric toothbrush including an electric air compressor of the present disclosure.

Referring to FIG. 11, the electric pressurizing device 404-51 may also be an electric air pressurizing device 404-51-1. The electric air pressurizing device 404-51-1 may be an electric air compressor 404-51-11. At this time, a partition plate 15-2-1 is also arranged in the water and waterway mounting space 15-2 of the housing 15, the partition plate 15-2-1 partitions the water and waterway mounting space 15-2 into a water tank mounting space 15-2-11 and a pressurizing device mounting space 15-2-12.

The electric air compressor 404-51-11 includes an air intake system 404-51-111, an air compressor 404-51-112 and an air filling pipe 404-51-113. The air compressor 404-51-112 is mounted in the pressurizing device mounting space 15-2-12, the air filling pipe 404-51-113 penetrates through the partition plate 15-2-1, and then an air filling nozzle is placed over the water in the water tank 404-2, in order to ensure that the electric air compressor 404-51-11 can continuously compress and pressurize air. An air intake hole 15-3 is also formed in a side wall of the housing 15.

After the power system 11 is switched on, the power system 11 supplies power to the electric air compressor 404-51-11, the air compressor 404-51-112 works, the air intake system 404-51-111 delivers air to the air compressor 404-51-112, and after the air compressor 404-51-112 compresses and pressurizes the air, the pressurized air is used for pressurizing the water in the water tank 404-2 through the air filling pipe 404-51-113. When the water spraying switch 404-4 is turned on, the pressurized water will be sprayed out from the sprayer 11 through the water pipe 404-3 to rinse teeth.

It should be noted that, the structures disclosed and described in the present disclosure may be replaced by other structure with the same effect, and the embodiments described in the present disclosure are not intended to limit the present disclosure. Though the preferred embodiments of the present disclosure have been introduced and described in the specification, persons skilled in the art should know that these embodiments are merely described by way of example, and persons skilled in the art may make various changes, improvements, and replacements without departing from the present disclosure. Therefore, the protection scope of the present disclosure should be defined in accordance with the spirit and scope of the appended claims of the present disclosure.

The invention claimed is:

1. A multi-functional visual electric toothbrush, comprising a main unit, an oral viewer, an interdental cleaning appliance and an electric toothbrush head, wherein:
   A. the main unit comprises a power system, a circuit system, a control system, a toothbrush driving mechanism and a housing, the power system, the control system and the toothbrush driving mechanism are connected together through the circuit system, and the electric toothbrush head is connected to the toothbrush driving mechanism, and is adapted to be mounted on the main unit;
   B. the oral viewer comprises a housing, a lighting system, an observation system and a switch, the lighting system, the observation system, the power system and the switch are connected together through the circuit system and the control system, and the oral viewer is adapted to be connected to the main unit; and
   C. the interdental cleaning appliance is mounted on the oral viewer.

2. The multi-functional visual electric toothbrush according to claim 1, wherein the toothbrush driving mechanism comprises a vibration generating device and a vibration transferring device capable of transferring vibration generated by the vibration generating device, one end of the vibration transferring device is connected to the vibration generating device, and the other end of the vibration transferring device is connected to the electric toothbrush head.

3. The multi-functional visual electric toothbrush according to claim 2, wherein the vibration generating device is an electromagnetic vibration device, including one selected from the group consisting of an electromagnetic oscillator, a magnetic suspension motor, and a piezoelectric transducer.

4. The multi-functional visual electric toothbrush according to claim 2, wherein the electric toothbrush head is detachably mounted on the vibration transferring device.

5. The multi-functional visual electric toothbrush according to claim 4, wherein the electric toothbrush head is detachably mounted on the vibration transferring device in a concave-convex engaging connection manner, an interference fit connection manner or a rotary connection manner.

6. The multi-functional visual electric toothbrush according to claim 1, wherein the lighting system and the observation system are arranged at a front end of the oral viewer, and the lighting system and the observation system are connected to the main unit through the circuit system and the control system.

7. The multi-functional visual electric toothbrush according to claim 6, wherein the front end of the oral viewer is detachably mounted on the main unit.

8. The multi-functional visual electric toothbrush according to claim 7, wherein the front end of the oral viewer is detachably mounted on the main unit in a rotary connection manner or a concave-convex engaging connection manner.

9. The multi-functional visual electric toothbrush according to claim 6, wherein the front end of the oral viewer is foldably mounted on the main unit.

10. The multi-functional visual electric toothbrush according to claim 9, wherein the front end of the oral viewer is foldably mounted on the main unit through a rotation shaft type movement mechanism or a concave-convex engagement mechanism.

11. The multi-functional visual electric toothbrush according to claim 1, wherein the interdental cleaning appliance is an interdental brush, or dental floss, or a toothbrush, or a water pick, or an object fetching clamp, or an object fetching hook.

12. The multi-functional visual electric toothbrush according to claim 11, wherein a brush head of the interdental brush, a line of the dental floss, bristles of the toothbrush, a water column sprayed by the water pick, a clamp head of the object fetching clamp and a head of the object fetching hook are within a visual field of the observation system of the oral viewer.

13. The multi-functional visual electric toothbrush according to claim 11, wherein the interdental cleaning appliance is detachably mounted on the oral viewer through a connection mechanism.

14. The multi-functional visual electric toothbrush according to claim 13, wherein the connection mechanism is one selected from the group consisting of a rotary connection mechanism, a concave-convex engaging connection mechanism, and an interference fit connection mechanism.

15. The multi-functional visual electric toothbrush according to claim 11, wherein the water pick comprises a sprayer, a water tank, a water pipe, a water spraying switch and a pressurizing device, the water tank and the pressurizing device are mounted on the housing of the main unit, and the sprayer is mounted near the observation system at the front end of the oral viewer.

16. The multi-functional visual electric toothbrush according to claim 15, wherein the pressurizing device is an electric pressurizing device.

17. The multi-functional visual electric toothbrush according to claim 16, wherein the electric pressurizing device is an electric air pressurizing device or an electric water pressurizing device.

18. The multi-functional visual electric toothbrush according to claim 11, wherein a sprayer of the water pick may be disposed in the housing at the front end of the oral viewer.

19. The multi-functional visual electric toothbrush according to claim 11, wherein the water pick may be used cooperatively with the interdental brush, or the dental floss, or the toothbrush, or the object fetching clamp, or the object fetching hook.

20. The multi-functional visual electric toothbrush according to claim 19, wherein the direction of a water column sprayed by the water pick is substantially the same as the direction of the interdental brush or the dental floss entering tooth gaps.

* * * * *